US006959935B2

United States Patent
Buhl et al.

(10) Patent No.: US 6,959,935 B2
(45) Date of Patent: Nov. 1, 2005

(54) STEERING TRIANGLE

(75) Inventors: Reinhard Buhl, Bohmte (DE);
Reinhard Richter, Bohmte (DE); Uwe Cossmann, Tecklenburg (DE); Ralf Kunze, Bad Essen (DE); Holger Bublies, Osnabrück (DE); Sören Knopp, Ostercappen (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/771,064

(22) Filed: Feb. 3, 2004

(65) Prior Publication Data

US 2004/0155422 A1 Aug. 12, 2004

Related U.S. Application Data

(63) Continuation of application No. PCT/DE03/00418, filed on Feb. 12, 2003.

(30) Foreign Application Priority Data

May 2, 2002 (DE) .......................................... 102 19 708

(51) Int. Cl.$^7$ ................................................ B60G 9/00
(52) U.S. Cl. ........... 280/124.11; 180/352; 280/124.111; 403/135
(58) Field of Search ....................... 280/93.502, 124.11, 280/124.1, 124.111, 124.116, 93.511, 124.134, 124.135, FOR 128, FOR 129, FOR 130, FOR 131, FOR 132, FOR 134; 403/76, 135; 384/206, 209, 210; 180/352

(56) References Cited

U.S. PATENT DOCUMENTS 3,007,729 A 11/1961 Carlson

| | | |
|---|---|---|
| 5,033,722 A | 7/1991 | Lammers |
| 5,338,055 A | 8/1994 | Mauz |
| 6,231,264 B1 | 5/2001 | McLaughlin et al. |
| 6,305,699 B1 | 10/2001 | König |
| 6,511,084 B1 * | 1/2003 | Buhl et al. ............ 280/124.107 |

FOREIGN PATENT DOCUMENTS

| | | |
|---|---|---|
| DE | 702 442 | 1/1941 |
| DE | 40 33 805 A1 | 4/1992 |
| DE | 41 00 296 C1 | 6/1992 |
| DE | 199 32 678 A1 | 5/2000 |
| EP | 1 034 949 A2 | 9/2000 |
| EP | 1 120 299 A1 | 8/2001 |

* cited by examiner

*Primary Examiner*—Eric Culbreth
(74) *Attorney, Agent, or Firm*—McGlew and Tuttle, P.C.

(57) ABSTRACT

A steering triangle (1) is provided for the axle suspension of motor vehicles for the articulated connection of a vehicle axle with a vehicle chassis with two control arms (2, 3). The control arms are connected to each other in a joint housing (6) formed by the control arms (2, 3) together for a rubber-metal bearing (11) for fixing the steering triangle (1) on the vehicle axle. The rubber-metal bearing (11) has a pivot axis (12) provided with a spherical surface and an elastomer body (14), which extends around the pivot axis (12) at least in the area of the spherical surface and which is accommodated in a recess (16) located within the joint housing (6), in which steering triangle two pressing rings (17, 18) are arranged within the recess (16) of the joint housing (6) on the axial outer sides of the elastomer body (14). The pressing rings can be moved toward each other by a tensioning device via the intermediary of stop faces (22) of the joint housing (6). The stop faces are in contact with the outer sides of the pressing rings (17, 18), which outer sides face away from each other. The rubber-metal bearing can be pretensioned both in the axial direction and in the radial direction, so that stronger forces can be absorbed due to the higher rigidity achieved as a result.

13 Claims, 2 Drawing Sheets

STEERING TRIANGLE

CROSS REFERENCE TO RELATED APPLICATION

This is a continuation of and claims the benefit (35 U.S.C. §120 and 365(c)) of copending International Application PCT/DE 03/00418 of Feb. 12, 2003, which designated inter alia the United States and which claims the priority of German Application DE 102 19 708.3 of May 2, 2002. The entire contents of each application is hereby incorporated by reference in its entirety.

FIELD OF THE INVENTION

The present invention pertains to a steering triangle for the axle suspension of motor vehicles for the articulated connection of a vehicle axle with the vehicle chassis with two control arms, which are connected to each other in a joint housing formed together by the said control arms.

BACKGROUND OF THE INVENTION

Such steering triangles, which have been known from the state of the art, are used especially in utility vehicles. Thus, for example, a control arm for a motor vehicle wheel suspension has been known, which comprises a two-part arm body, wherein the two arm bodies form at one of their ends a common mount for a rubber-metal bearing, by means of which the control arm can be fixed at a wheel carrier or an axle. The opposite free ends are used for the body-side fixation of the steering triangle.

Such control arms are usually designed as forged or cast parts, and, when viewed in the top view, a relatively large area is required especially in the case of cast parts within the framework of the preparation of the casting molds, even though the mass of the two control arms proper is relatively small. The division of the steering triangle into two control arms, which may optionally have identical shape, offers a considerable cost advantage in this respect, which can also be felt favorably in the case in which the steering triangle is designed as a forged part, because a considerable reduction of the operations involved in the manufacture can be brought about due to the division into two parts.

However, the drawback of such control arms is that the rubber-metal bearing arranged within the central joint housing formed by the two control arms together provides for the pretension of the elastomer body responsible for the elastic mounting in the radial direction only due to its design. Since elastomer bodies can absorb, in general, only extremely low tensile stresses, the bearing described within the framework of the invention is hardly suitable for absorbing axial loads.

SUMMARY OF THE INVENTION

The object of the present invention is therefore to further improve a steering triangle of the type corresponding to this type such that the stresses occurring especially in utility vehicles can be absorbed to an increased extent by the central bearing of the steering triangle for the axle connected thereto.

This object is accomplished according to the present invention in that two pressing rings, which can be moved toward each other by a pressing device via the intermediary of stop faces of the joint housing, which stop faces are in contact with the outer sides of the pressing rings, which said outer sides face away from each other, are arranged within the recess of the joint housing on the axial outer sides of the elastomer body. Due to this design according to the present invention, especially the elastomer body, which extends especially around the spherical surface of the pivot axis or pivot part, can be precompressed or prepressing not only in the radial direction, but also in the axial direction. This prepressing is decisive for the rigidity of the elastomer body in the axial direction, the value of the rigidity being proportional to the capacity for absorbing axial forces that occur.

Another advantage of the present invention can be seen in the fact that due to the possibility of axial, prepressing the rubber-metal bearing can be set for different requirements, whereas the rubber blend used for the elastomer body may have to be modified for different rigidities in conventional constructions known from the state of the art.

The pressing rings are preferably rigidly connected to the customer body, and this rigid connection may be embodied, e.g., by vulcanization/molding-on. The proceccing in the axial direction is performed via the pressing rings.

Provisions are made according to an expedient variant for the pressing device to have a plurality of pressing screw connections, which are arranged in parallel to the pivot axis and are accommodated in through holes of the joint housing. The pressing screw connections represent an inexpensive possibility of a simple design for prepressing the pressing rings by screwing together the control arms in the area of the joint housing formed jointly with the necessary forces.

Sufficient pressing forces are provided here, e.g., by three or more pressing screw connections arranged coaxially around the central recess for the rubber-metal bearing.

To reduce the shearing forces appearing in the area of the central joint housing connection especially in the case of very great torsions of the two control arms in relation to one another and not to overload the pressing screw connections located there, it proved, moreover, to be advantageous to provide at least one of the pressing screw connections with a shearing sleeve, which is arranged within the through hole associated with the said pressing screw connection and extends around the tensioning screw.

However, it is also possible to provide all pressing screw connections with shearing sleeves which are arranged within the through holes and extend around the pressing screws.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
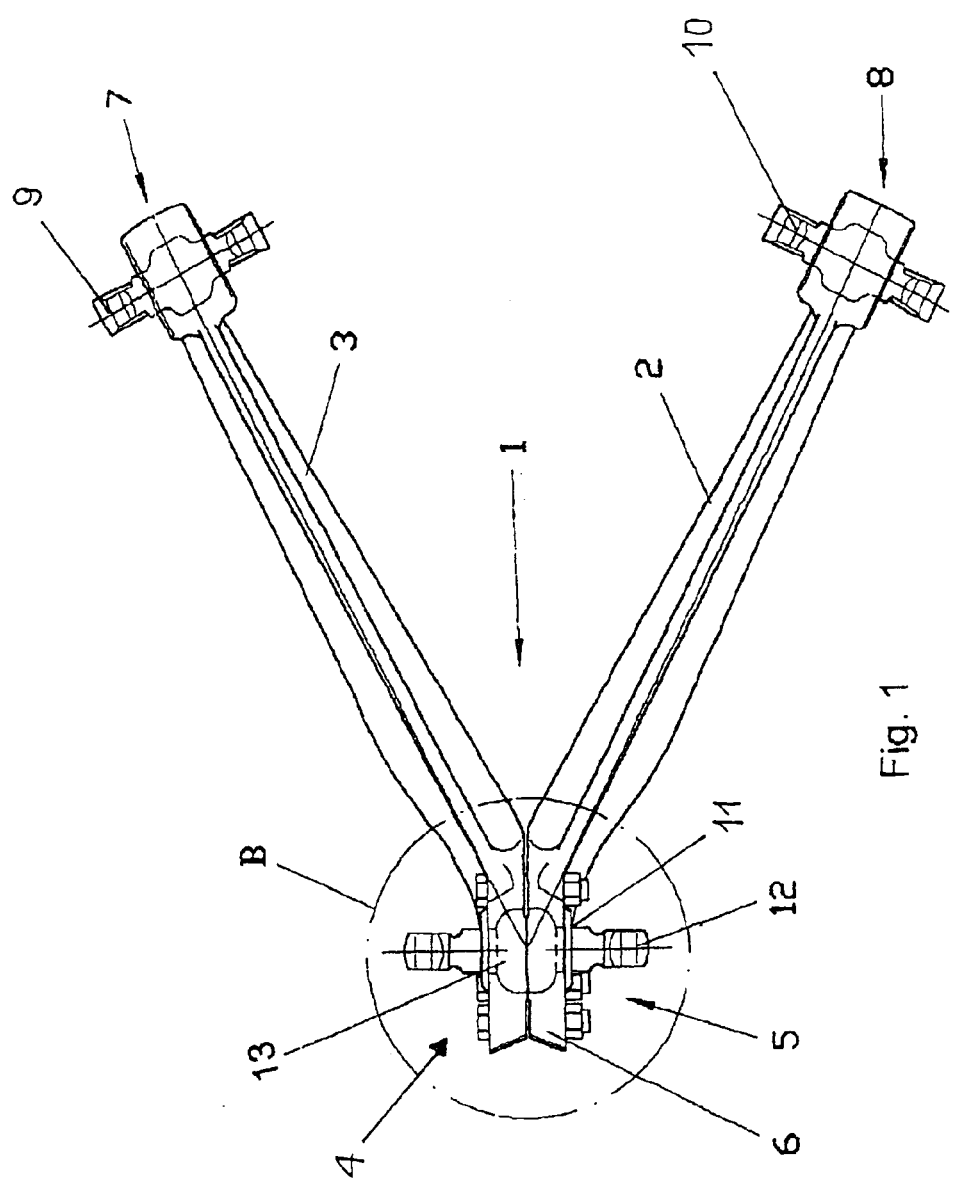
FIG. 1 is a top view of a steering triangle according to an embodiment of the present invention.

Referring to the drawings in particular, the steering triangle is designated in its entirety by 1 and is shown in FIG. 1. The steering triangle 1 has two control arms 2 and 3, which are mirror-symmetrical to each other. The control arm 2 has an end area 5 bent at an angle. The control arm 3 has an end area 4 bent at an angle. The two end areas 4 and 5 together form the joint housing 6. Due to the end areas 4 and 5 being bent at angles and the contact surfaces of the control arms 2 and 3 located in this area, the entire steering triangle 1 has an essentially V-shaped form when viewed in the horizontal projection. The steering triangle 1 has two end areas 7 and 8, which are used for fastening the steering triangle 1 to body-side mounts, which are not specifically shown here. The steering triangle 1 is fastened in an articulated manner by means of rubber-metal bearings 9 and 10. A rubber-metal bearing 11 establishes an articulated connection with a utility vehicle axle, which is fastened to the rubber-metal bearing. The utility vehicle axle is not specifically shown here. The rubber-metal bearing 11 is likewise accommodated in the joint housing 6 formed by the two control arms 2 and 3.

Figure 2:
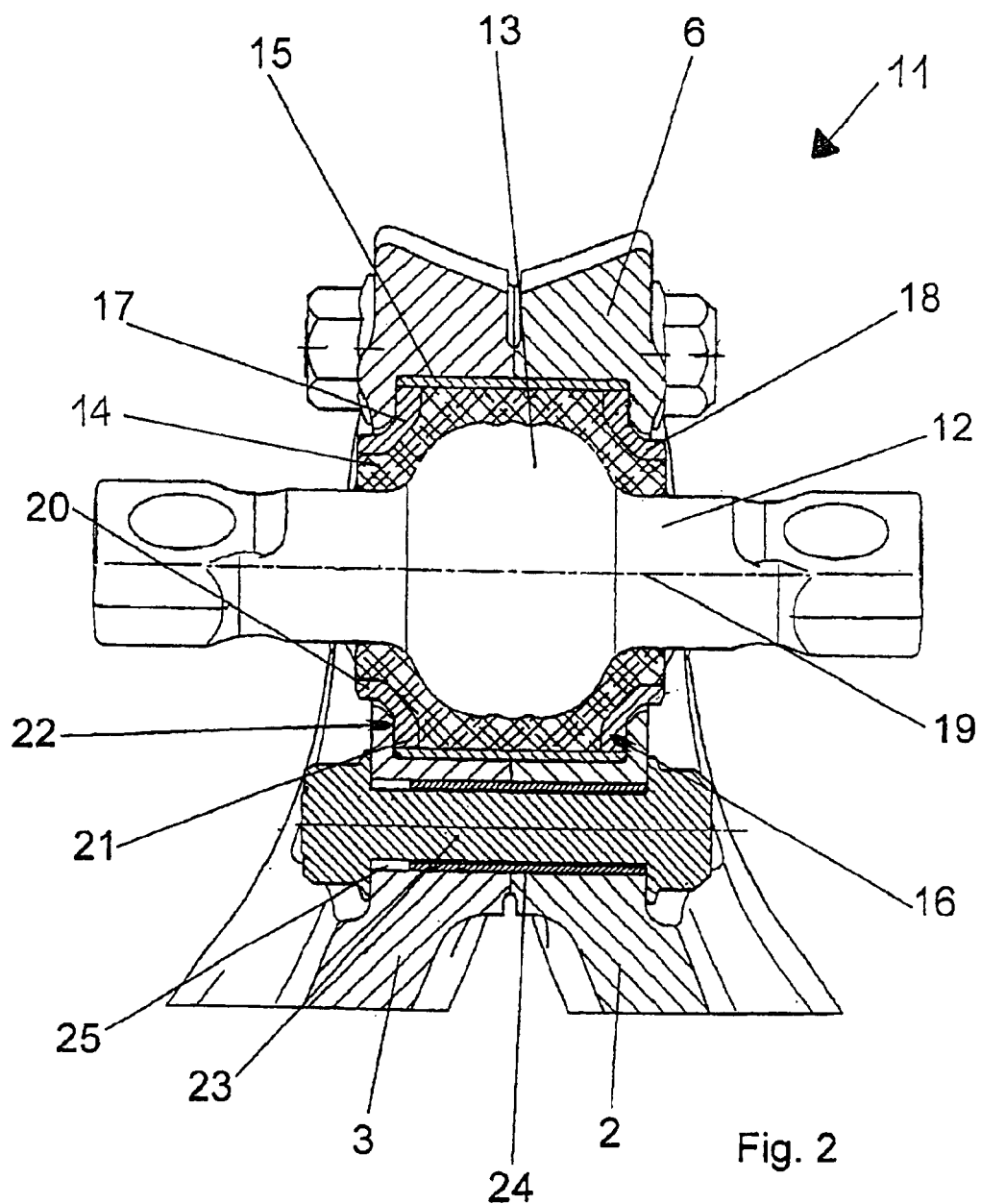
FIG. 2 is a sectional view of detail B from FIG. 1 in the area of the joint housing formed by the two control arms together.

The special embodiment of the joint housing 6 with the rubber-metal bearing 11 located therein is shown in greater detail in FIG. 2. The rubber-metal bearing 11 contains a pivot part or pivot axis 12 with a spherical segment 13 arranged symmetrically with the ends of the pivot axis. The spherical segment 13 is surrounded by a one-part or multi-part elastomer body 14, which is arranged via the intermediary of a sleeve 15 in a recess 16 of the joint housing 6 formed by the end areas of the control arms 2 and 3. Two pressing rings 17 and 18 are molded on the axial outer sides of the elastomer body 14 by vulcanization. The pressing rings 17 and 18 have a flange area 20 arranged essentially in parallel to the central longitudinal axis 19 of the pivot axis 12 as well as a flange area 21 projecting outwardly at right angles thereto. On the outer side of the flange area 21 facing away in the elastomer body 14, a stop face 22 of the joint housing 6 is in contact with the flange area.

As is additionally apparent from FIG. 2, the two control arms 2 and 3 of the steering triangle 1 are connected to each other via a pressing device comprising a plurality of pressing screw connections 23. At least one pressing screw connection comprises a pressing screw with a not screwed on it as well as a shearing sleeve 24 surrounding the pressing screw. The at least one pressing screw connection 23 is arranged within a through hole 25 of the joint housing 6 with the shearing sleeve 24 extending around the pressing screw. The screwing together of the pressing screw connections 23 causes the rubber-metal bearing 9 inserted loosely into the recess 16 to be fixed both in the radial direction by the sleeve 15 and in the axial direction by the pressing rings 17 and 18, and forces of pressure are applied at the same time on the elastomer body 14. As a result of this a prepressing of the component is brought about and, as a result of this, the rigidity of the elastomer body 14 is increased, so that forces of pressure applied by a movement of the pivot axis 12 on the elastomer body 14 can be absorbed without problems after the end of the installation.

It should be observed in this connection that the elastomer body 14 is fixed at the pivot axis 12 and at the pressing rings 17, 18 by means of a vulcanization process. The connection between the elastomer body 14 and the sleeve 15 is due only to corresponding frictional forces.

While a specific embodiment of the invention has been shown and described in detail to illustrate the application of the principles of the invention, it will be understood that the invention may be embodied otherwise without departing from such principles.

What is claimed is:

1. A steering triangle for an axle suspension of a motor vehicle for an articulated connection of a vehicle axle with a vehicle chassis, the steering triangle comprising:

two control arms connected to each other to form a joint housing;

an elastomer body accommodated in a recess located within said joint housing;

a pivot part with a pivot axis for fixing said steering triangle to the vehicle axle;

a rubber-metal bearing comprising said elastomer body a metallic surface of said joint housing and said pivot part, said rubber-metal bearing being connected to said two control arms at said joint housing, said pivot part being provided with a spherical surface, and said elastomer body extending around said pivot part at least in an area of said spherical surface, said elastomer body being accommodated in a recess located within said joint housing;

two pressing rings;

a pressing device, said pressing rings being movable toward each other by said pressing device via the intermediary of stop faces of said joint housing, said stop faces being in contact with outer sides of said pressing rings facing away from each other, said stop faces facing each other and said pressing rings arranged within said, recess of said joint housing on axial outer sides of said elastomer body, said elastomer body being penetrated by said pivot axis.

2. A steering triangle in accordance with claim 1, wherein said pressing device has a plurality of pressing screw connections arranged in parallel to said pivot axis and respectively accommodated in through holes of said joint housing.

3. A steering triangle in accordance with claim 2, wherein at least one of said pressing screw connections is provided with a sleeve for reducing shearing forces around said joint housing, said sleeve arranged within said through hole associated with said one of said pressing screw connections and extending around the pressing screw.

4. A motor vehicle axle suspension steering triangle comprising:

a first control arm;

a second control arm connected to said first control arm, said first control arm and connected second control arm defining a joint housing with a bearing space having stop faces;

a pivot part with a spherical surface portion;

an elastomer body extending around a portion of said pivot part in an area of said spherical surface, said elastomer body being accommodated in said bearing space;

a first pressing ring;

a second pressing ring; and a pressing means including a pressing device for moving said pressing rings toward each other by said pressing device via the intermediary of said stop faces of said joint housing, one of said stop faces being in contact with an outer side of said first pressing ring and another of said stop faces being in contact with an outer side of said second pressing ring.

5. A steering triangle in accordance with claim 4, wherein said pressing means has a plurality of pressing screw connections arranged in parallel to said pivot axis and respectively accommodated in through holes of said joint housing.

6. A steering triangle in accordance with claim 5, wherein at least one of said pressing screw connections is provided with a sleeve arranged within said through hole associated with said one of said pressing screw connections and extending around the pressing screw.

7. A motor vehicle axle suspension steering triangle according to claim 4 wherein said first control arm has an end that forms a first joint housing part with one of said stop faces, and said second control arm has an end that forms a second joint housing part with another of said stop faces, wherein said first joint housing part and said second joint housing part together define said joint housing.

8. A motor vehicle axle suspension steering triangle according to claim 7, wherein said first pressing ring and said second pressing ring are movable toward each other by means of said one stop face of first joint housing part and said another stop face of second joint housing part.

9. A motor vehicle axle suspension steering triangle according to claim 8 wherein said pressing ring act on said first joint housing part and said second joint housing part separately.

10. A motor vehicle axle suspension steering triangle according to claim 9 wherein each of said control arms is formed separately and includes an end area bent at an angle, said end area assuming a shape of said joint housing part.

11. A motor vehicle axle suspension steering triangle comprising:
   a first disparate control arm with a distal end forming a first joint housing part, said first disparate control arm being bent at an angle near said distal end;
   a second disparate control arm with another distal end forming a second joint housing part, said second disparate control arm bent at an angle near said another distal end, wherein said first joint housing part and said second joint housing part together define a joint housing having an inner bearing space, and said first joint housing part including an inner side comprising a first rigid portion and said second joint housing part including an inner side comprising a second rigid portion;
   a pivot part having an axis and having a spherical surface portion;
   an elastomer body extending around a portion of said pivot part in an area of said spherical surface, said elastomer body being accommodated in said inner bearing space; and
   a pressing means accommodated in holes of said joint housing and pressed against said first portion and said second portion.

12. A motor vehicle axle suspension steering triangle according to claim 11, wherein said pressing means is a pressing screw.

13. A motor vehicle axle suspension steering triangle according to claim 12, further comprising:
   a sleeve extended around said pressing screw and arranged within said through hole.

* * * * *